No. 760,993. PATENTED MAY 24, 1904.
B. DE K. JACKSON.
BOLT TURNING HEAD.
APPLICATION FILED SEPT. 19, 1903.
NO MODEL.
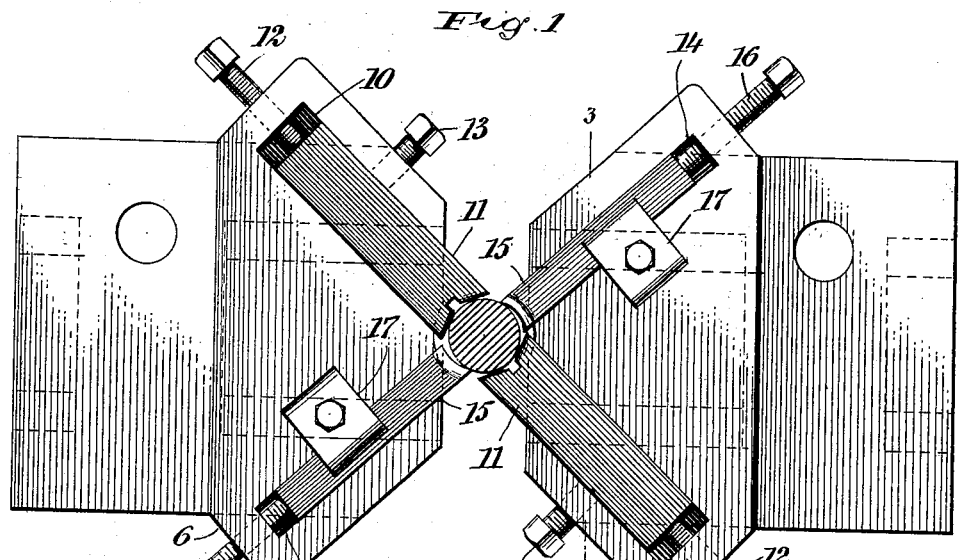
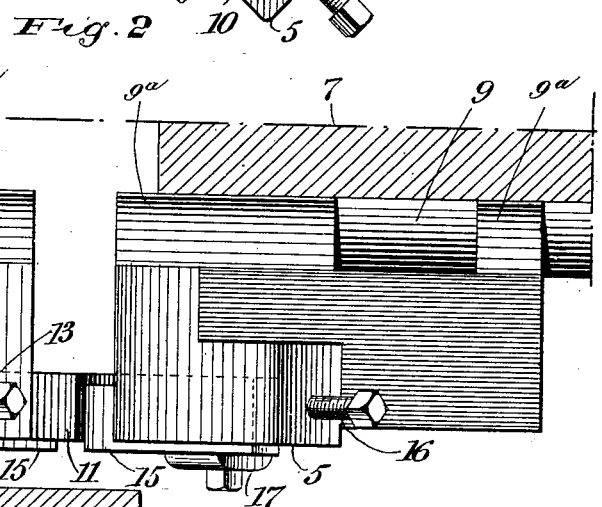
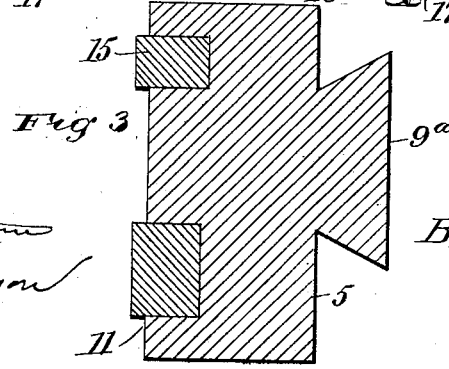
WITNESSES:
INVENTOR
Byron De K. Jackson
BY
ATTORNEYS No. 760,993.

Patented May 24, 1904.

UNITED STATES PATENT OFFICE.

BYRON DE KALB JACKSON, OF ALTOONA, PENNSYLVANIA.

BOLT-TURNING HEAD.

SPECIFICATION forming part of Letters Patent No. 760,993, dated May 24, 1904.

Application filed September 19, 1903. Serial No. 173,851. (No model.)

*To all whom it may concern:*

Be it known that I, BYRON DE KALB JACKSON, a citizen of the United States, and a resident of Altoona, in the county of Blair and State of Pennsylvania, have invented a new and Improved Bolt-Turning Head, of which the following is a full, clear, and exact description.

This invention relates to improvements in devices for turning bolts, rivets, or the like, an object being to provide a turning-head by means of which the work may be rapidly done and which may be quickly adjusted for different sizes of bolts.

I will describe a bolt-turning head embodying my invention and then point out the novel features in the appended claim.

Reference is to be had to the accompanying drawings, forming a part of this specification, in which similar characters of reference indicate corresponding parts in all the figures.

Figure 1 is a face view of a bolt-turning head embodying my invention. Fig. 2 is a side view thereof, partly in section; and Fig. 3 is a section on the line 3 3 of Fig. 1.

The turning-head comprises two sections 5 6, mounted to slide, respectively, in guides 7 8. The guides are here shown as channeled, the opposite walls of the channel being undercut, as at 9, and each member or section of the head is provided with dovetailed lugs $9^a$ for engaging in its channel. The head-sections are of soft metal or other suitable material, and each section is provided with a channel 10, in which a guide 11 is mounted to slide. These guides or stays 11 are designed to engage with the bolt or the work to be turned, and they are held as adjusted to the bolt by means of set-bolts 12, extending through tapped holes in the head-sections and engaging with the outer ends of the guides or stays, and they are further held by means of lateral bolts 13. The head-sections are also provided with channels 14, in which cutters 15 are lengthwise adjustable. They are held as adjusted lengthwise by means of set-bolts 16, and they are held from outward movement by means of clips 17, fastened to the head members and engaging over the outer surfaces of the tools.

It will be noted that the guides 11 and the tools all converge toward the center and that the tools are opposite each other, as are also the guides. It will be noted also that the tools project slightly outward of the face of the head, so as to allow for clearance while turning and to allow for finishing of the under side of the head of a bolt.

Having thus described my invention, I claim as new and desire to secure by Letters Patent—

A bolt-turning head comprising two sections, each section having divergent channels in its outer side, a guide in one channel of each section, a cutting-tool in the other channel of each section, the said guides in the two sections being in axial alinement, the said cutting-tools in the two sections being also in axial alinement, dovetailed lugs on the sides of the sections opposite the channeled sides, and guide members having channels in which said lugs are slidable.

In testimony whereof I have signed my name to this specification in the presence of two subscribing witnesses.

BYRON DE KALB JACKSON.

Witnesses:
    EDGAR L. KURTZ,
    JOHN L. RONCORONI.